United States Patent
Rogers

(10) Patent No.: US 10,938,302 B2
(45) Date of Patent: Mar. 2, 2021

(54) ELIMINATION OF POWER INDUCTOR THERMISTOR WITH VARIABLE AIR GAP

(71) Applicant: FORD GLOBAL TECHNOLOGIES, LLC, Dearborn, MI (US)

(72) Inventor: Craig Brian Rogers, Belleville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 678 days.

(21) Appl. No.: 15/787,840

(22) Filed: Oct. 19, 2017

(65) Prior Publication Data

US 2019/0123631 A1  Apr. 25, 2019

(51) Int. Cl.
| | |
|---|---|
| *G05F 1/325* | (2006.01) |
| *H02M 3/155* | (2006.01) |
| *G01K 5/48* | (2006.01) |
| *H02H 5/04* | (2006.01) |
| *H01F 3/14* | (2006.01) |
| *H02H 3/087* | (2006.01) |
| *H02H 9/02* | (2006.01) |
| *H02M 1/00* | (2006.01) |
| *H02M 1/32* | (2007.01) |

(52) U.S. Cl.
CPC .............. *H02M 3/155* (2013.01); *G01K 5/48* (2013.01); *G05F 1/325* (2013.01); *H01F 3/14* (2013.01); *H02H 3/087* (2013.01); *H02H 5/04* (2013.01); *H02H 9/02* (2013.01); *H02M 1/00* (2013.01); *H02M 2001/0009* (2013.01); *H02M 2001/0064* (2013.01); *H02M 2001/327* (2013.01); *H02M 2003/1552* (2013.01)

(58) Field of Classification Search
CPC ......... G05F 1/325; H01F 3/14; H02H 7/1213; H02H 5/04; H02M 2003/1552; H02M 2001/327; H02M 3/155; G01K 5/48
See application file for complete search history.

(56) References Cited

U.S. PATENT DOCUMENTS

| | | | | |
|---|---|---|---|---|
| 4,210,947 | A * | 7/1980 | Koizumi | H01F 38/02 361/103 |
| 5,886,516 | A * | 3/1999 | Barrett | H02M 1/4241 323/331 |
| 6,109,035 | A * | 8/2000 | Guruprasad | F02B 75/02 60/513 |
| 7,957,166 | B2 | 6/2011 | Schnetzka et al. | |
| 8,466,766 | B2 | 6/2013 | Carsten | |
| 10,256,024 | B1* | 4/2019 | Rogers | G01R 19/10 |
| 2009/0167537 | A1* | 7/2009 | Feliss | B60L 53/305 340/584 |
| 2015/0002112 | A1* | 1/2015 | Tang | H02H 7/1213 323/271 |

(Continued)

*Primary Examiner* — Harry R Behm
(74) *Attorney, Agent, or Firm* — David B. Kelley; Brooks Kushman P.C.

(57) ABSTRACT

A power system comprises a converter including an inductor core defining a gap, and a separator spanning the gap and contacting the core. The power system also includes a controller programmed to, responsive to a decrease in current ripple amplitude output by the converter to less than a first threshold, decrease power supplied by the converter. The first threshold is indicative of an inductance change through the core due to a temperature driven decrease in size of the separator.

20 Claims, 2 Drawing Sheets

(56) References Cited

U.S. PATENT DOCUMENTS

2016/0105125 A1* 4/2016 Lee .................. H02M 3/33507
　　　　　　　　　　　　　　　　　　　　　363/126
2016/0266277 A1* 9/2016 Blackburn ........... G01V 11/002
2017/0084375 A1　 3/2017 Vafakhah et al.

* cited by examiner

ELIMINATION OF POWER INDUCTOR THERMISTOR WITH VARIABLE AIR GAP

TECHNICAL FIELD

The present disclosure relates to a power converter, particularly to an inductor magnetic core of a power converter.

BACKGROUND

Electrified vehicles including hybrid-electric vehicles (HEVs), plugin hybrid electric vehicles (PHEVs), and battery electric vehicles (BEVs) include a DC to DC converter which has a boost inductor. The traction motors of the electrified vehicles include inverters which require different voltages at different times. The DC to DC converter accommodates the required voltage even when the battery input voltage remains within a narrow range. Because of the large amounts of current through the inductor, and the magnitude of voltage being switched across the inductor, the temperature of the inductor can rise. Conventional inductor systems include a thermistor or other temperature measurement device to monitor inductor core temperature.

SUMMARY

According to an embodiment, a power system is provided. The power system comprises a converter including an inductor core defining a gap, and a separator spanning the gap and contacting the core. The power system also includes a controller programmed to, responsive to a decrease in current ripple amplitude output by the converter to less than a first threshold, decrease power supplied by the converter. The first threshold is indicative of an inductance change through the core due to a temperature driven decrease in size of the separator.

According to one or more embodiments, the controller may be programmed to, responsive to an increase in the current ripple amplitude output by the converter greater than a second threshold, decrease power supplied by the converter. The second threshold may be indicative of an inductance change through the core due to a temperature driven increase in size of the separator. Further, the controller may be programmed to, responsive to an increase in the current ripple amplitude output by the converter greater than a third threshold greater than the second threshold, shut off power supplied to the converter. In one or more embodiments, the separator may comprise a material that expands as temperature increases. According to one or more embodiments, the temperature driven decrease in size may be based on a predefined thermal expansion coefficient of the separator. In some embodiments, the controller may be programmed to, responsive to a decrease in current ripple amplitude output by the converter to less than a second threshold less than the first threshold, shut off power supplied to the converter. According to one or more embodiments, the separator may comprise a material that softens as temperature increases.

According to an embodiment, a method of controlling a power system is provided. The method includes, by a controller, responsive to a change in current ripple amplitude output by a converter, altering power supplied by the converter. The converter includes an inductor core defining a gap, and a separator spanning the gap and contacting the core. The change in current ripple amplitude output by the converter is indicative of an inductance change through the core due to a temperature driven change in size of the separator.

According to one or more embodiments, the change in current ripple amplitude may be a decrease, the change in size may be a decrease, and the altering may include decreasing. According to another embodiment, the change in current ripple amplitude may be an increase, the change in size may be an increase, and the altering may include decreasing. According to one or more embodiments, the change in current ripple amplitude may be greater than a first threshold for altering power supplied to the converter. Further, the change in current ripple amplitude may be greater than a second threshold, greater than the first threshold, and altering may include shutting off power supplied by the converter. In one or more embodiments, the altering may include shutting off power supplied by the converter.

According to an embodiment, a power system is provided. The power system comprises a converter including an inductor core defining a gap, and a separator spanning the gap and contacting the core. The power system also includes a controller programmed to, responsive to an increase in current ripple amplitude output by the converter to greater than a first threshold, decrease power supplied to the converter. The first threshold is indicative of an inductance change through the core due to a temperature driven increase in size of the separator According to one or more embodiments, the controller may be programmed to, responsive to a decrease in the current ripple amplitude output by the converter to less than a second threshold, decrease power supplied to the converter. The second threshold may be indicative of an inductance change through the core due to a temperature driven decrease in size of the separator. Further, the controller may be programmed to, responsive to a decrease in current ripple amplitude of the converter to less than a third threshold lower than the second threshold, shut off power supplied to the converter. In one or more embodiments, the separator may comprise a material that softens as temperature increases. In one or more embodiments, the temperature driven increase in size may be based on a predefined thermal expansion coefficient of the separator. According to one or more embodiments, the controller may be programmed to, responsive to an increase in current ripple amplitude of the converter to greater than a second threshold greater than the first threshold, shut off power supplied to the converter. In one or more embodiments, the separator may comprise a material that expands as temperature increases.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
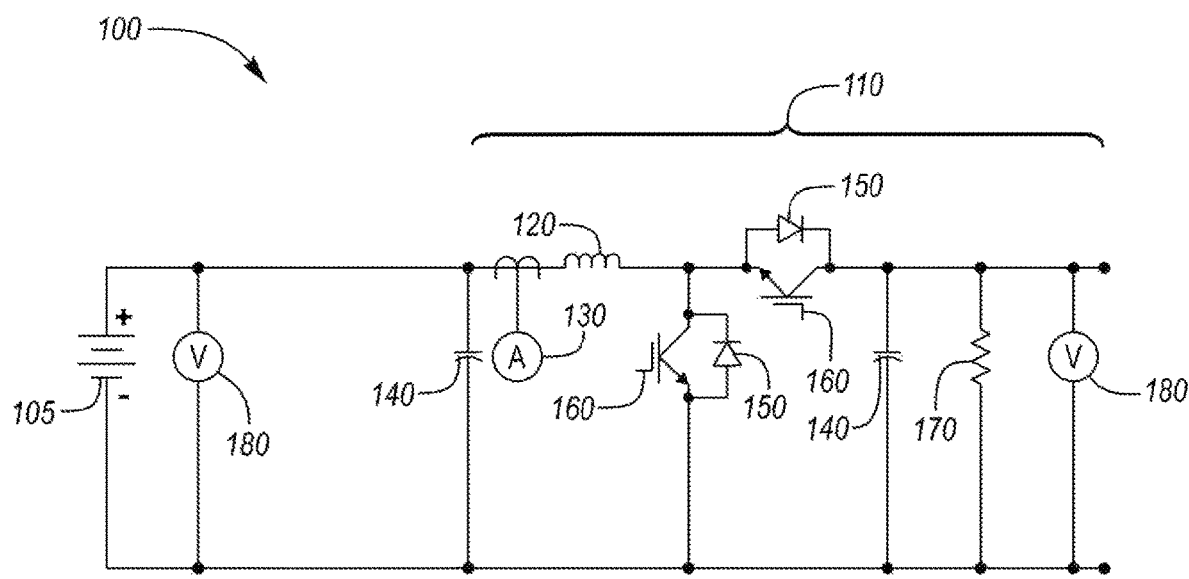
FIG. 1 is a circuit diagram of a power system.

Inductors are used in DC to DC power converters to store energy in a magnetic field during one part of an operating cycle, and to return all or part of that energy during another part of the cycle. A boost inductor is typically used in DC to DC converters to supply a desired voltage to traction motors of power systems for electrified vehicles. FIG. 1 shows a circuit diagram of the power system 100. The power system 100 includes a high voltage traction battery (or batteries) 105 and the high voltage-high current DC to DC converter (or DC/DC converter) 110. The DC/DC converter 110 includes diodes 150 and insulated gate bipolar transistors (IGBT) 160. Although IGBTs are shown in FIG. 1, the transistors 160 are not limited to IGBTs, and may include other transistors such as MOSFET transistors. The DC/DC converter 110 also includes power inductor 120, capacitors 140, and resistor 170. The DC/DC converter 110 accommodates the required voltage for the power system 100, even while the battery 105 input voltage remains within a narrow range. The system 100 includes an ammeter 130, for sampling current through the inductor, and voltmeters 180 for measuring voltage of the system 100. Current through the inductor 120 and the magnitude of voltage being switched across the inductor 120 can result in temperature increases of the inductor 120, and thus potential for the inductor 120 to operate beyond its temperature rating, resulting in safety and durability concerns.

Figure 2:
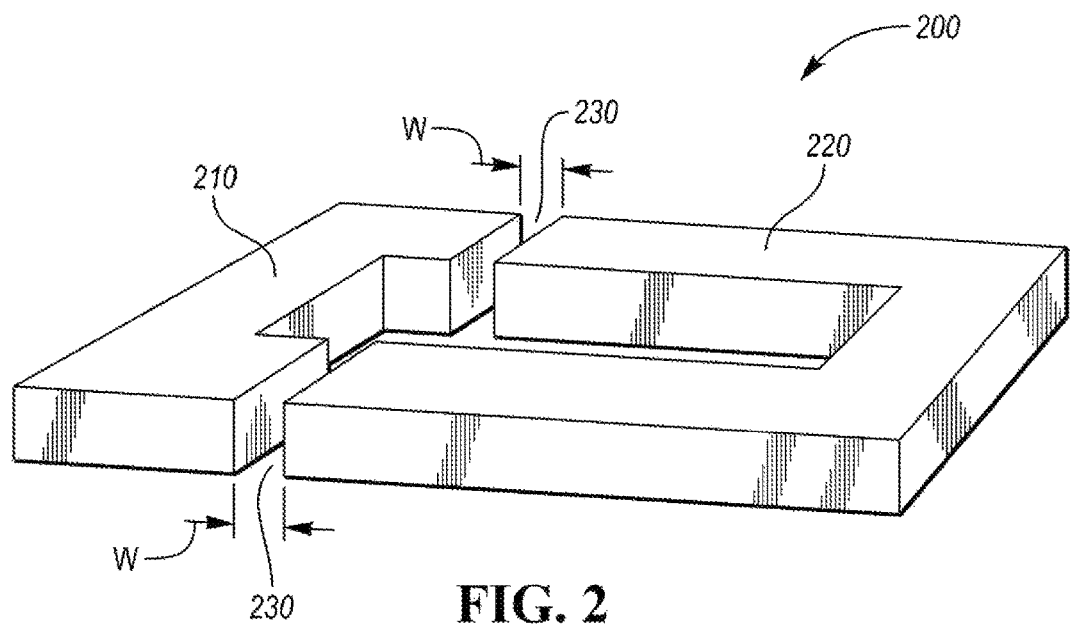
FIG. 2 is a schematic illustration of a conventional inductor core of a power converter system.

Conventional inductors such as power inductor 120 are typically comprised of a winding on an easily magnetized or "ferromagnetic" core. FIG. 2 shows a schematic illustration of a conventional inductor core 200. The inductor core 200 includes one or more core sections 210, 220, having one or more air respective gaps 230 between the sections 210, 220. The air gaps 230 in the core 200 help maximize the energy which can be stored in the inductor. The air gap 230 in conventional inductor 200 is shown in FIG. 2 as having a width W. Conventional inductors incorporate a thermistor for monitoring temperature and signal for power reduction when the inductor temperature rises above the rating. Including a thermistor raises safety and durability concerns due to failure of an additional part, and adds cost to producing inductors.

According to one or more embodiments, a power system and method of controlling a power system is disclosed. Referring back to FIG. 1, a power system 100 includes a power inductor 120 as part of the DC to DC converter 110. The power system 100 according to the present disclosure is capable of monitoring the temperature of the inductor without the need for a thermistor or other separate temperature measurement device.

Figure 3A:
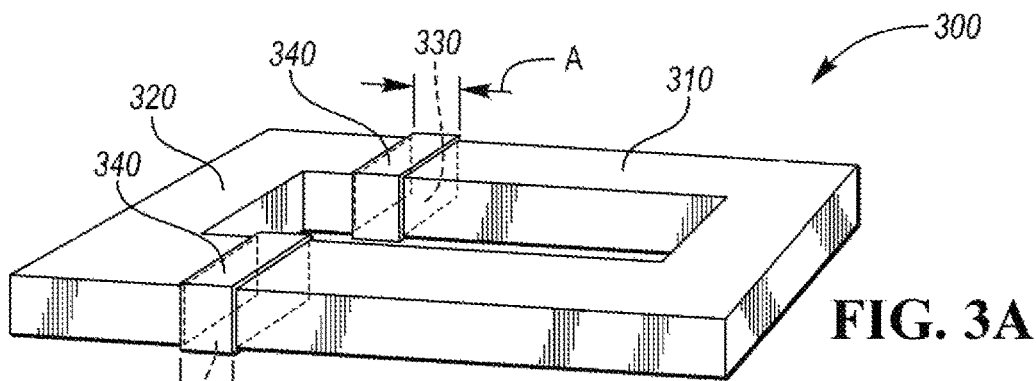
FIG. 3A is a schematic illustration of an inductor core according to one or more embodiments.

FIG. 3A shows a schematic illustration of an inductor core 300 according to one or more embodiments of the present disclosure. The inductor core 300 includes core sections 310, 320. The inductor core 300 is made of an easily magnetized or "ferromagnetic" material, and is wrapped with windings (not shown) around the sections 310, 320 to form the inductor of the power system. Gaps 330 are respectively disposed between the core sections 310, 320. Although two core sections 310, 320, with respective gaps 330 are shown for illustrative purposes, any number of core sections with the respective number of gaps may be contemplated.

A separator 340 is disposed in each respective gap 330, contacting the core sections 310, 320. The separator 340 has a width A, filling gap 330. Although two separators 340 are shown for illustrative purposes, any number of separators may be included in the gaps. In some embodiments, not all the gaps may include separators (i.e., only some gaps include separators). In other embodiments, all the gaps include a respective separator. The separator 340 is chosen to control the width of the gap 330. The separator 340 is made of a material having a predefined thermal expansion coefficient. The predefined thermal expansion coefficient indicates how much the separator 340 will change the size of the gaps 330. By selecting material for separator 340, the thermistor or other temperature measurement devices can be removed from the power inductor. The separator 340 material selection provides known changes in the gap width over a range of temperatures, given the predefined thermal expansion coefficient. This change in gap width (indicative of high temperature) results in a change in inductor core reluctance. As the reluctance of the core now changes with temperature, the inductance of the inductor now changes as the temperature of the inductor changes.

Figure 3B:
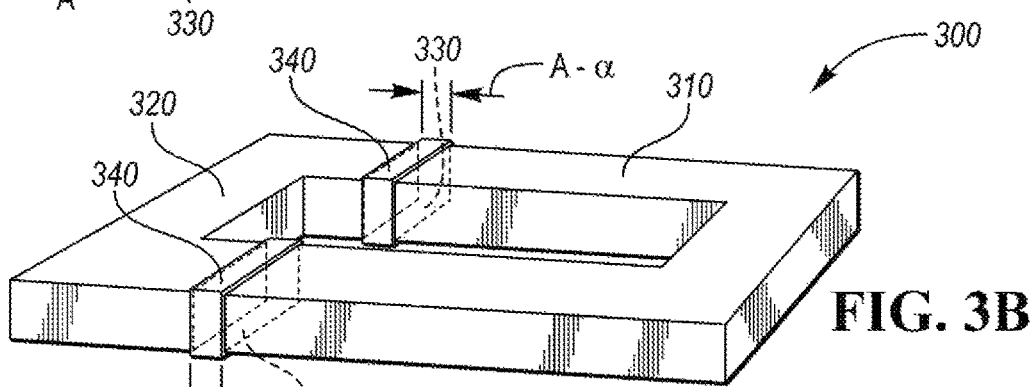
FIG. 3B is a schematic illustration of an inductor core according to an embodiment.

In some embodiments, the material of the separator 340 may be chosen such that it softens or contracts at high temperatures, depending on the thermal expansion coefficient, causing the width of the gap to shrink by α, based on the thermal expansion coefficient and temperature change, to A−α, as shown in FIG. 3B. For example, as the core is magnetized and at a high temperature, an attractive force between the core sections puts compressive strain on the softened separator 340, thus shortening the width of the gap 330 and altering the inductance as detected by a decrease in the current ripple amplitude.

Figure 3C:
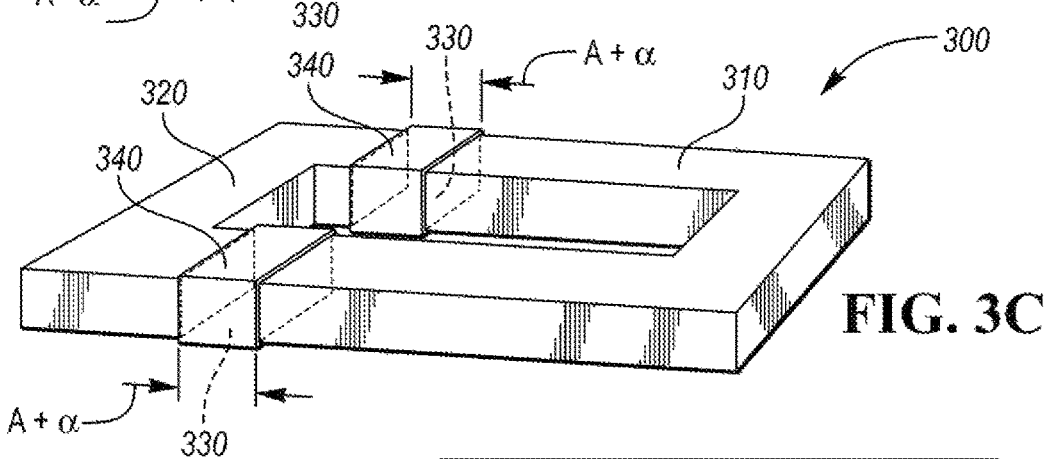
FIG. 3C is a schematic illustration of an inductor core according to an embodiment.

In other embodiments, the material of the separator 340 may be chosen to control the width of the gap such that it expands at high temperatures, depending on the predefined thermal expansion coefficient, causing the width of the gap 330 to increase by α, based on the thermal expansion coefficient and temperature change, to A+α, as shown in FIG. 3C. For example, as the core is magnetized and at a high temperature, the separator 340 expands due to the material properties and pushes the core sections 310, 320 apart, thus altering the inductance as detected by an increase in current ripple amplitude.

Figure 4:
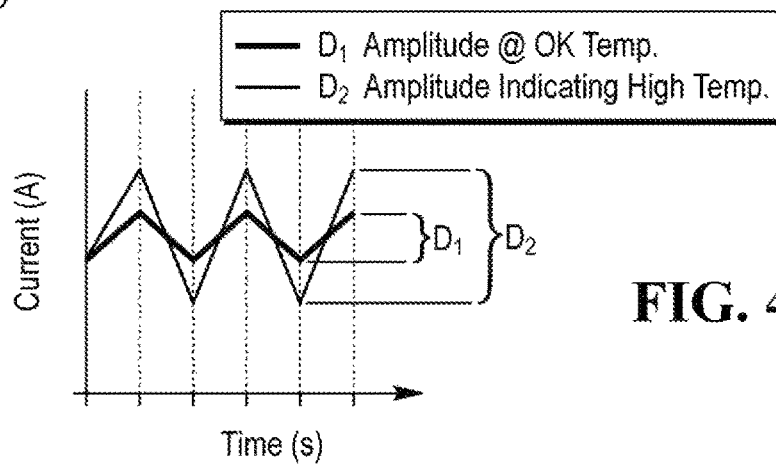
FIG. 4 is a graph of current through the windings of an inductor at different temperatures according to an embodiment.

Referring again to FIG. 1, the power system 100 further includes a controller (not shown), which is electrically connected to the DC to DC converter's current sensor (such as ammeter 130) and microprocessor (not shown). The ammeter 130 and microprocessor monitor current ripple, which is indicative of the inductance change without adding measurement components to the power system. The ammeter 130 and microprocessor measure current ripples across the inductor core over time, and mapping the changes in current ripple magnitude (or amplitude), as shown in FIG. 4. The microprocessor is configured to measure the current ripple through the DC to DC converter when average current may be the same via the ammeter 130, and is configured to determine the change in current over time (di/dt). The microprocessor obtains the input voltage and output voltage levels from voltmeter 180. It can then calculate the inductance with the following equation:

$$VL/(di/dt)=L$$

where: VL is the voltage across the inductor,
L is the inductance of the inductor, and
di/dt is the rate of change of the current through the inductor.

The microprocessor is configured to obtain the complete current waveform, as opposed to just average current, by using a current sampling range greater than two times the fundamental frequency, or the Nyquist rate, for the switching frequency of the converter. For example, if the converter was switching at 10 kHz, the microprocessor would need to sample at greater than 20 kHz. For a given current through the inductor, measured voltage across the inductor, and the measured di/dt, the microprocessor is configured to calculate the inductance of the inductor at that moment, correlating the inductance with the current ripple amplitude which varies with temperature. Although the average current remains the same, the current ripple changes at higher temperatures, depending on the material selected for the separator, indicating a change in inductance. The inductance change is correlated with known changes in temperature, since it is based on the change in size of the gap in the core based on the predefined thermal expansion coefficient changing the core gap width a known amount. By correlating the inductor's inductance and current at different temperatures, the microprocessor can determine the temperature of the inductor based on the predefined thermal expansion coefficient of the separator material being indicative of certain inductance ranges.

Upon detecting a high core temperature from the current ripple amplitude, such as an inductance signaling a temperature outside the temperature rating of the inductor, the microprocessor signals the controller to decrease the power supplied by the converter, thus allowing the inductor to cool. The power may be decreased a certain amount based on the change in inductance (as measured by current ripple decreasing to under a first threshold, or increasing to higher than a second threshold), the change in inductance being indicative of a temperature close to the inductor rating. Whether the current ripple increases or decreases depends on the selected material for the air gap (whether the gap width increases, or decreases, respectively), as previously discussed.

In certain embodiments, the power supplied by the converter may be completely shut-off if the change in inductance (as measured by current ripple) is indicative of a high temperature beyond the rating, where the current ripple decreases to lower than a third threshold lower than the second (for a gap size decrease), or the current ripple increases to higher than a third threshold higher than the second (for a gap width increase). Because of this, the traditional temperature measurement devices may not be needed which improves safety and durability, and reduces cost.

By using a separator within the gap, gap width can be controlled such that the inductance of the core changes a known amount at high temperatures, indicative of a need to lower or shut off power supplied by the converter. The material for the separator may soften or contract, thus decreasing the width of the gap, or expand increasing the gap, resulting in the inductance change indicative of a high temperature, which is monitored by the current switching and current ripple magnitude through the inductor. By using a separator with known properties, additional temperature monitoring components, such as thermistors, may not be necessary.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A power system comprising:
a converter including an inductor core defining a gap, and a separator spanning the gap and contacting the inductor core, the separator having a known thermal expansion coefficient; and
a controller programmed to,
responsive to a temperature driven decrease in size of the separator resulting in a known length change based on the thermal expansion coefficient,
    detect a decrease in current ripple amplitude output by the converter indicative of a change in inductance,
    determine the change in inductance based on the decrease in current ripple amplitude, measured voltage across the inductor core, and known current through the inductor core, and
    determine a temperature change based on the change in inductance and the known thermal expansion coefficient, and
responsive to the decrease in current ripple amplitude being less than a first threshold indicative of the temperature change resulting in the temperature driven decrease in size of the separator, decrease power supplied by the converter.

2. The power system of claim 1, wherein the controller is programmed to, responsive to a temperature driven increase in the size of the separator, resulting in the known length change based on the thermal expansion coefficient, detect an increase in the current ripple amplitude output by the converter indicative of a change in inductance, determine the change in inductance based on the increase, and determine the temperature change, and responsive to the increase in current ripple amplitude being greater than a second threshold indicative of the temperature change resulting in the temperature driven increase in size of the separator, decrease power supplied by the converter.

3. The power system of claim 2, wherein the controller is programmed to, responsive to the increase in the current ripple amplitude output by the converter greater than a third threshold greater than the second threshold, shut off power supplied to the converter.

4. The power system of claim 2, wherein the separator comprises a material that expands as temperature increases.

5. The power system of claim 1, wherein the temperature driven decrease in size is based on a predefined thermal expansion coefficient of the separator.

6. The power system of claim 1, wherein the controller is programmed to, responsive to a decrease in current ripple amplitude output by the converter to less than a second threshold less than the first threshold, shut off power supplied to the converter.

7. The power system of claim 1, wherein the separator comprises a material that softens as temperature increases.

8. A method of controlling a power system comprising:
by a controller,
measuring a change in current ripple amplitude output by a converter, including (i) an inductor core defining a gap and (ii) a separator spanning the gap and contacting the inductor core;

determining an inductance change based on the change in current ripple amplitude, measured voltage across the inductor, and known current through the inductor core;

comparing the inductance change to a known inductance change correlated to known changes in temperature which result in a change in size of the separator based on a known thermal expansion coefficient; and altering power supplied by the converter based on the known inductance change.

9. The method of claim 8, wherein the change in current ripple amplitude is a decrease, the change in size is a decrease, and the altering includes decreasing.

10. The method of claim 8, wherein the change in current ripple amplitude is an increase, the change in size is an increase, and the altering includes decreasing.

11. The method of claim 8, wherein the change in current ripple amplitude is greater than a first threshold for altering power supplied to the converter.

12. The method of claim 11, wherein the change in current ripple amplitude is greater than a second threshold, greater than the first threshold, and altering includes shutting off power supplied by the converter.

13. The method of claim 8, wherein the altering includes shutting off power supplied by the converter.

14. A power system comprising:
a converter including an inductor core defining a gap, and a separator spanning the gap and contacting the inductor core, the separator having a known thermal expansion coefficient; and
a controller programmed to,
responsive to a temperature driven increase in the separator, resulting in a known length change based on the known thermal expansion coefficient,
  detect an increase in current ripple amplitude output by the converter indicative of a change in inductance,
  determine the change in inductance based on the increase in current ripple amplitude, measured voltage across the inductor core, and known current through the inductor core, and
  determine a temperature change based on the change in inductance and the known thermal expansion coefficient, and
responsive to the increase being greater than a first threshold indicative of the temperature change resulting in the temperature driven increase in size of the separator, decrease power supplied to the converter.

15. The power system of claim 14, wherein the controller is programmed to, responsive to a decrease in the current ripple amplitude output by the converter to less than a second threshold indicative of the known inductance change correlated to a temperature driven decrease in size of the separator, decrease power supplied to the converter.

16. The power system of claim 15, wherein the controller is programmed to, responsive to the decrease in current ripple amplitude of the converter to less than a third threshold lower than the second threshold, shut off power supplied to the converter.

17. The power system of claim 15, wherein the separator comprises a material that softens as temperature increases.

18. The power system of claim 14, wherein the known inductance change correlated to the temperature driven increase in size is based on a predefined thermal expansion coefficient of the separator.

19. The power system of claim 14, wherein the controller is programmed to, responsive to the increase in current ripple amplitude of the converter to greater than a second threshold greater than the first threshold, shut off power supplied to the converter.

20. The power system of claim 14, wherein the separator comprises a material that expands as temperature increases.

* * * * *